(12) United States Patent
Rossi

(10) Patent No.: US 8,279,609 B2
(45) Date of Patent: Oct. 2, 2012

(54) WEARABLE CONTAINING ELEMENT FOR AN ELECTRONIC APPARATUS

(75) Inventor: Mauro Rossi, Gemona del Friuli (IT)

(73) Assignee: Eurotech SpA, Amaro (IT)

(*) Notice: Subject to any disclaimer, the term of this patent is extended or adjusted under 35 U.S.C. 154(b) by 404 days.

(21) Appl. No.: 12/595,552

(22) PCT Filed: Apr. 9, 2008

(86) PCT No.: PCT/EP2008/054271
§ 371 (c)(1),
(2), (4) Date: Oct. 12, 2009

(87) PCT Pub. No.: WO2008/125562
PCT Pub. Date: Oct. 23, 2008

(65) Prior Publication Data
US 2010/0043491 A1   Feb. 25, 2010

(30) Foreign Application Priority Data
Apr. 12, 2007 (IT) .............................. UD2007A0068

(51) Int. Cl.
*H05K 5/00* (2006.01)
(52) U.S. Cl. .................... 361/730; 361/728; 361/752
(58) Field of Classification Search .............. 361/752, 361/728–730, 796, 800; 174/520; 312/223.1, 312/223.2
See application file for complete search history.

(56) References Cited

U.S. PATENT DOCUMENTS

| | | | |
|---|---|---|---|
| 4,556,932 A | 12/1985 | Lehrer et al. | |
| 5,473,145 A | 12/1995 | Wallerstorfer et al. | |
| 6,296,364 B1 | 10/2001 | Day et al. | |
| 6,433,483 B1 | 8/2002 | Michael et al. | |
| 6,752,649 B2 * | 6/2004 | Arkin et al. | 439/491 |
| 7,325,744 B2 * | 2/2008 | Porter | 235/486 |
| 2002/0075697 A1 | 6/2002 | Lam | |
| 2005/0113081 A1 | 5/2005 | Tushinsky et al. | |

FOREIGN PATENT DOCUMENTS

| | | |
|---|---|---|
| DE | 29707755 U1 | 7/1997 |
| DE | 198 24 643 A1 | 11/1999 |
| EP | 0 565 022 A1 | 10/1993 |
| EP | 0 894 449 A1 | 2/1999 |
| FR | 2 790 121 A1 | 8/2000 |
| JP | 2006-061466 A | 3/2006 |
| WO | 99/23906 A1 | 5/1999 |

* cited by examiner

*Primary Examiner* — Hung S Bui
(74) *Attorney, Agent, or Firm* — Hedman & Costigan, P.C.; James V. Costigan

(57) ABSTRACT

A wearable containing element for an electronic apparatus, comparable to an ornament or pendant, comprising at least a pair of complementary shells, able to be coupled with each other so as to define a containing body with an external surface having a shape and size comparable to those of a traditional ornament, and an internal containing compartment, of a shape and size sufficiently large to house the electronic apparatus.

7 Claims, 1 Drawing Sheet

WEARABLE CONTAINING ELEMENT FOR AN ELECTRONIC APPARATUS

CROSS-REFERENCE TO RELATED APPLICATION

This application is a section 371 of International Application No. PCT/EP2008/054271, filed Apr. 9, 2008, which was published in the English language on Oct. 23, 2008 under International Publication No. WO 2008/125562 A1 and the disclosure of which is incorporated herein by reference.

FIELD OF THE INVENTION

The present invention concerns a wearable containing element for a commonly used electronic apparatus. In particular, the wearable containing element according to the present invention has externally the shape and size of an ornament, such as for example a pendant, a bracelet, an ear-ring or more generally a jewel, inside which the electronic apparatus is contained, substantially unseen.

BACKGROUND OF THE INVENTION

Portable electronic apparatuses are known, such as for example cell phones, smart phones, wrist processors or others, of limited size and shaped more or less ergonomically so as to be comfortably transported and/or worn by a user.

This type of transportable and/or wearable electronic apparatuses, however, need specific support members, such as strings, laces, straps, belts, clips, rucksacks, pouches, holders, cases or other, which allow to anchor and/or attach them to specific parts of the user's body, such as for example to the wrist, the back, the waist, the legs etc.

In the field of portable electronics, there is an ever-growing need to reduce to a minimum both the size and also the aesthetic impact of wearable electronic apparatuses, making them substantially invisible and of minimum hindrance to the movements and normal gestural expressiveness of the person wearing them.

Until now, however, solutions have been proposed in which the apparatuses, although of miniaturized size, must in any case use specific support members to be worn on the different parts of the body.

A further disadvantage of the state of the art is that, with traditional systems, the electronic apparatuses, even if very small, are transported and/or worn by users only when they are actually necessary, that is, only for the time strictly necessary for active use. This is because their application to the specific parts of the body is in any case an auxiliary to the normal objects worn, such as watches, jewels or other, and causes a potentially irritating encumbrance for the user, who normally prefers to carry them inside hand bags or clothes pockets. However, the manual transportation of the apparatus limits the user's effectiveness, for example when driving a vehicle, or during manual work.

The risk must also be considered that the electronic apparatuses can be directly subject to knocks, falls, contamination or other source of possible damage.

Prior devices are known, for example from U.S. Pat. No. 6,296,364, U.S. Pat. No. 4,556,932 and US-A1-2002/075697, that comprise ornamental items having two shells able to be open each other and defining inside, when closed, a seating for an electronic circuit coupled with a source of light, which selectively switches on in order to transmit the light to the outside of the item.

Purpose of the present invention is to achieve a wearable containing element for a portable electronic apparatus which allows to reduce to a minimum the aesthetic impact of the electronic apparatus, making it substantially invisible, which does not cause an auxiliary and unusual encumbrance for the user, which protects it from sources of possible damage, and which encourages the wearer to continue wearing the electronic apparatus even when it is not being used.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purpose, a wearable containing element for an electronic apparatus according to the present invention is of the type similar to a pendant, and comprises at least a pair of complementary shells able to be coupled and hermetically closed in a sealed way with each other, so as to define a containing body having an external surface of a shape and size comparable to those of an ornament, and an internal compartment sufficiently large to allow the electronic apparatus and all the accessories necessary for its functioning, in particular at least a rechargeable battery and the relative recharge circuit for the autonomous feeding thereof, to be completely housed inside. Each of the two shells is at least partly made of a plastic polymer having characteristics of transparency to electromagnetic radiations in the field of radiofrequencies.

The feature of transparency to electromagnetic radiations, from one hand, allows the apparatus according to the invention to operate as a transmitter/receiver for wireless exchanging data and establishing a communication between one or more other similar apparatuses, and from another hand, allows to make contact-less recharging operations of the battery from outside, without using connectors and without requiring the opening of the shells, which therefore may be sealed each other at the manufacturing in a perfectly hermetic way.

Another advantage deriving from the transparency of the shells to electromagnetic radiations is the possibility to modify or updating the software that runs in the electronic apparatus without requiring the opening of the shells and the removal of the electronic circuit.

With the present invention we therefore have that the electronic apparatus is housed, substantially invisible and hermetically closed, in a containing sealed element having the shape, size and functions, both aesthetic and technical, identical or at least comparable to those of an ornament, or more generally a jewel, traditionally worn by a person.

In this way, the aesthetic impact of the electronic apparatus is reduced to a minimum, making it substantially invisible.

Advantageously, each complementary shell comprises specific seatings and/or recesses, shaped, and able to define the internal housings for the different electronic components, such as for example batteries, antennas, circuits or others, which make up the electronic apparatus contained therein. The seatings and/or recesses are made so as to affect as little as possible the bulk and the aesthetic form of the containing body.

Moreover, since the containing element has a shape, size and aesthetic functions comparable to those of a normal ornament wearable as a pendant, it does not cause an auxiliary and unusual encumbrance with respect to objects traditionally worn, and thus encourages the wearer to continue wearing it even when not in use.

In addition, since the shells are hermetically closed each other, the electronic apparatus according to the invention can be transported and used in a condition protected from external events, also in water or other dangerous environments, such as in sport activities.

The application of evolved technologies for molding plastic material allows to keep the size of the electronic apparatus limited, and hence to have further freedom for shaping the relative external surfaces of the two shells, so as to be able to provide different aesthetic lines of the support element.

In a preferential form of embodiment of the present invention, the plastic polymer that makes up each shell is advantageously chosen from the class of polycarbonates, since this class of plastic polymers not only has a good transparency to electromagnetic radiations in the field of radiofrequencies, but also has anallergic characteristics and guarantees, once the two shells have been coupled, an optimum hermetic seal of the internal compartment.

According to another form of embodiment of the present invention, on the external surface of each shell, a film of thermoformed polycarbonate is deposited during the molding step, which has been previously finished aesthetically, so as to simulate a traditional ornament made of metal and precious stones, mineral or other specific material, such as gold, silver, with a polished or other surface finishing treatment.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
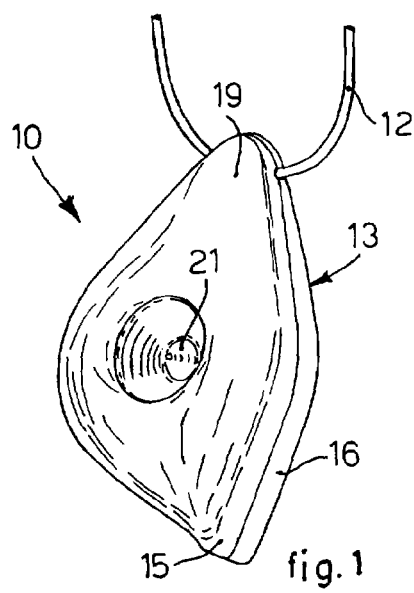
FIG. 1 shows a wearable containing element for an electronic apparatus according to the present invention.
Figure 2:
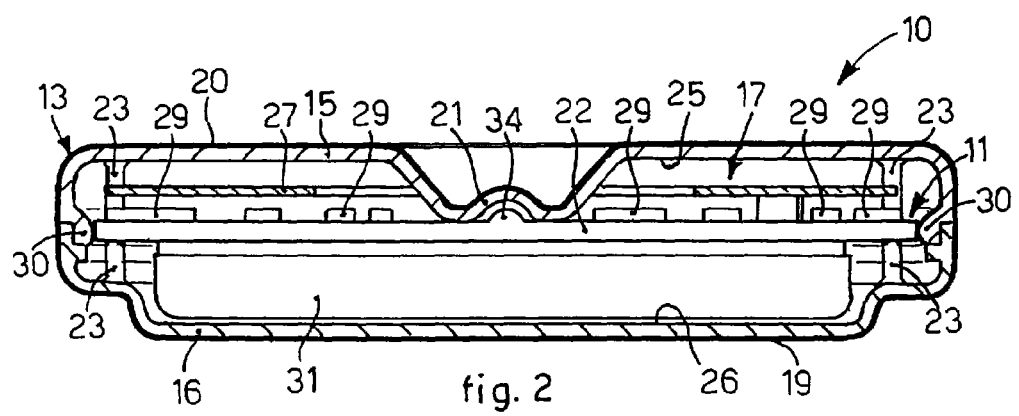
FIG. 2 is a sectioned view of the containing element in FIG. 1.
Figure 3:
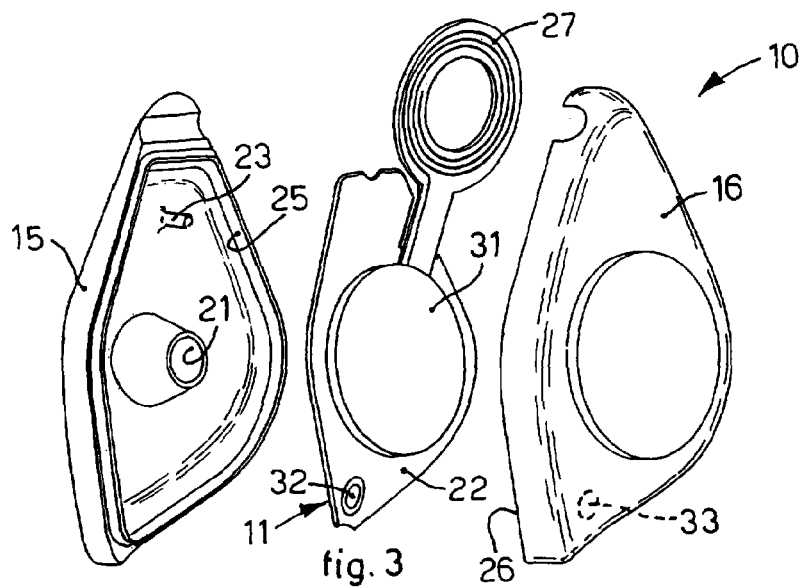
FIG. 3 is an exploded view of the containing element in FIG. 1, with the relative electronic apparatus.

With reference to the attached drawings, a containing element 10 according to the present invention in this case has the shape of a pendant to be worn around the neck, and is able to contain inside it an electronic apparatus 11, in this case consisting of a transmission and reception device like a pervasive object, an active or passive rfid tag or other.

In particular, the containing element 10 substantially comprises a lace or chain 12, worn around the neck, and a containing body 13, holed to allow coupling with the chain 12, and consisting of two complementary shells, respectively a first 15 and a second 16.

Each complementary shell 15, 16 defines, in the assembled condition, a relative part of an internal compartment 17 of the containing body 13, big enough to house inside it the electronic apparatus 11, and an external surface 19 having the shape, size and aesthetic functions comparable to those of a traditional pendant.

The two shells 15, 16 are preferably attached each other by means of ultrasonic welding, so as to ensure the perfect seal between each other and give the element 10 according to the invention waterproof properties and high resistance to infiltrations of dust or other dirt.

In particular, the electronic apparatus 11 comprises a multi-layer rigid-flexible circuit 22 shaped on the perimeter in a manner mating with the internal shape and size of the containing compartment 17, and on which specific electronic components are connected.

In this case, at least a micro-controller, a radio device, a chip antenna, some leds, a buzzer or other, are provided on the multi-layer circuit 22, as minimum electronic components, each of which is generically indicated by the reference number 29, and described hereafter in greater detail.

A battery 31 and a respective recharge circuit, not shown here, are also provided on the multi-layer circuit 22.

The correct positioning of the multi-layer circuit 22 inside the containing compartment 17 is defined and maintained by means of relative ribs 30 made inside the shells 15 and 16, or possibly/auxiliarily, as in the case shown here, by means of relative positioning blocks 23 made in an opposite manner inside each complementary shell 15, 16, so that the positioning blocks 23 grip the multi-layer circuit 22.

Each complementary shell 15, 16 also comprises one or more containing seatings, respectively 25 and 26, shaped so as to house corresponding electronic components which are part of the electronic apparatus 11 contained.

In this case, the containing seating 25 made on the internal part of the first complementary shell 15 is able to house mainly the set of electronic components 29 and a coil 27 for the induction type recharging of the batteries 31. The containing seating 26 made on the internal part of the second shell 16 is shaped so as to house inside it mainly the rechargeable battery 31 feeding the electronic apparatus 11 and the conductive patterns 32 made on the multi-layer circuit 22 and able to function as capacitive drive actuators once connected to the appropriate monitor circuitry.

Moreover, each complementary shell 15, 16 is made of polycarbonate, so that it is substantially anallergic, and hence compatible with being worn even in direct contact with the skin, and transparent to electromagnetic radiations in the field of radiofrequencies and transparent to both electric and magnetic static field lines.

This solution allows to use with maximum efficiency the radio chip antenna and the other electronic components 29, and technologies which provide to exchange information and establish a radio communication with other analogous electronic apparatuses.

In the solution shown, the batteries 31 are of the rechargeable type by electromagnetic induction, by means of a process of recharging through coupling of coils, so the batteries may be recharged from outside without opening the shells 15, 16.

In order to optimize the spaces occupied, in this case, the recharge coil 27, made on the multi-layer circuit 22, including a spiral conductor, and which in the assembled condition of the containing body 13 is connected to the circuit for recharging the batteries 31 and is folded back over the rigid portion of the multi-layer circuit 22, so as to be able to be stressed in an optimum manner from outside so as to effect an efficient recharging of the batteries 31, without needing to use cable connections.

In this way it is possible to eliminate any physical connection with the outside and therefore, since the containing element 10 is without connectors, the size of the electronic apparatus 11 is considerably reduced, so that the aesthetic form of the containing body 13 thus formed can simulate, in the most credible way possible, the actual shape and size of a traditional pendant.

The polycarbonate of which the two shells 15 and 16 consist, as we said, has characteristics of transparency to electric static field lines, so that, once assembled, the containing body 13 consists of a thickness of dielectric material, such as to make it possible to use it as an integrating part of one or more capacitive drive actuators, such as digital drive switches which allow the interactive use thereof even in the case of a perfectly hermetic shell.

In this case, the switches are represented by suitable conductive patterns 32 made on the printed circuit 22 and which are driven directly from outside the containing body 13 by approaching the fingers to suitable zones 33 provided on the outside of the shells 16 or 15. This solution for the actuators obviates the need to create any aperture in the shells 15, 16.

Each shell 15, 16 can also provide one or more zones 21 with high optical characteristics, for example to define a lens, a diffuser, an optical guide or other, so that, once assembled, the containing body 13 is transparent at least locally to electromagnetic light radiations, generated by a led 34, used to transfer information outside the electronic apparatus 11 located in the internal compartment 17.

The polycarbonate also allows to connect effectively the two shells 15 and 16, by means of ultrasound welding, so that the internal compartment 17 is perfectly hermetic and able to prevent liquids, solids and dust from entering inside it, therefore safeguarding the electronic apparatus 11 housed inside.

In this case, each shell is covered externally by a polycarbonate film 20, painted opaque, previously thermoformed and injected onto the relative shells 15, 16 during their molding step. It comes within the scope of the invention that only one of the shells 15, 16, or just a part of one or both the shells 15, 16, may be covered by the polycarbonate film 20.

The film is able to mask from sight the electronic apparatus 11 present in the internal compartment 17 of the containing body 13. Some zones are provided in which the masking is not required for functional reasons, for example points transparent to light radiation, or other.

The opaque painting of the polycarbonate film 20 is such as to simulate, advantageously, the surface finish typical of jewels, that is, providing the coloring of a precious metal, brilliance, smoothness or other. This effect can be obtained by applying special paints that simulate the appearance of silver, gold, precious stones or other.

Advantageously, the polycarbonate film 20 is painted on an internal surface which at the moment of molding will contact the relative shell 15, 16, so that the paint cannot suffer accidental damage, scratches, abrasions, decolorization, deterioration or other, caused by sweat, accidental fall, cleaning products or other.

It is clear, however, that modifications and/or additions of parts may be made to the containing element 10 as described heretofore, without departing from the field and scope of the present invention.

It is also clear that, although the present invention has been described with reference to specific examples, a person of skill in the art shall certainly be able to achieve many other equivalent forms of wearable containing element for an electronic apparatus, having the characteristics as set forth in the claims and hence all coming within the field of protection defined thereby.

The invention claimed is:

1. A wearable containing element for an electronic apparatus comparable to an ornament or a pendant, comprising at least a pair of complimentary shells, able to be coupled with each other so as to define a containing body having an external surface with a shape and size comparable to those of a traditional ornament, and an internal containing compartment, of a shape and size sufficiently large to house said electronic apparatus, wherein:
    each of said complimentary shells define, in the assembled condition, specific closed seatings shaped so as to house respective components of said electronic apparatus, said components being at least a rechargeable feed battery, a battery recharge circuit, a coil for the induction charging of the battery and means for exchanging information and establishing a radio communication with other analogous wearable elements;
    the complimentary shells are attached along mating peripheral edges thereof by welding so as to ensure a waterproof seal between each other wherein each of said complimentary shells is at least partly made of a plastic polymer that is transparent to electromagnetic radiation in the field of radiofrequencies, for allowing at least wireless exchanging of data between two analogous apparatuses and a contact-less recharging of the battery from outside without using connectors, said wearable containing element further comprising a suitable thermoformed polycarbonate film applied on said external surface of at least part of said containing body and able to be finished aesthetically, in gold, silver or a precious stone, so as to simulate a traditional ornament, also with regard to the resistance of the surfaces against damage caused by external stress including one or more capacitive switches comprising relative conductive patterns made on a printed circuit of said electronic apparatus, and able to be activated selectively by a user by approaching a part of a body to a correlated zone made on the outside of the relative shell.

2. The containing element as in claim 1, wherein said plastic polymer is advantageously chosen from the class of polycarbonates.

3. The containing element as in claim 1, wherein said complimentary shells comprise respective positioning members able to keep said electronic apparatus correctly positioned inside said compartment.

4. The containing element as in claim 1, wherein at least one of said complimentary shells comprises at least a zone with high optical characteristics, able to define, at least locally, a transparency of said containing body to electromagnetic radiations, generated by one or more leds of said electronic apparatus and able to act as a light guide, or lens, or as a diffuser.

5. The containing element as in claim 1, further comprising means associated with said containing body and able to allow said containing body to be worn on a part of a body of a user.

6. A method to produce a wearable containing element for an electronic apparatus, of the type comparable to an ornament or a pendant, said element comprising at least a pair of complimentary shells, able to be attached to each other so as to define a sealed waterproof containing body having an external surface with a shape and size comparable to those of a traditional ornament, and an internal containing compartment, of a shape and size sufficiently large to house said electronic apparatus, the method comprising:
    a first step of positioning inside said containing body at least a rechargeable feed battery with a battery recharge circuit which includes a coil for the induction charging of the battery and means for exchanging information and establishing a radio communication with other analogous wearable elements;
    a second step of welding said shells with each other so as to obtain a hermetic seal between said shells.

7. The method as in claim 6, comprising a previous step of applying a previously thermoformed polycarbonate film upon at least one of said shells, which resembles the appearance of gold, silver or other precious stone ort mineral, with a polished or other surface finishing.

* * * * *